June 20, 1967 — G. A. STAFFEND ET AL — 3,326,345
FRUIT PICKING AND HANDLING APPARATUS
Filed Oct. 1, 1965 — 3 Sheets-Sheet 1

INVENTORS
George A. Staffend &
Gilbert S. Staffend
BY Shoemaker and Mattare
ATTORNEYS

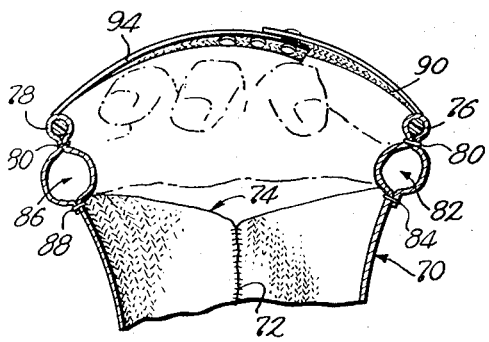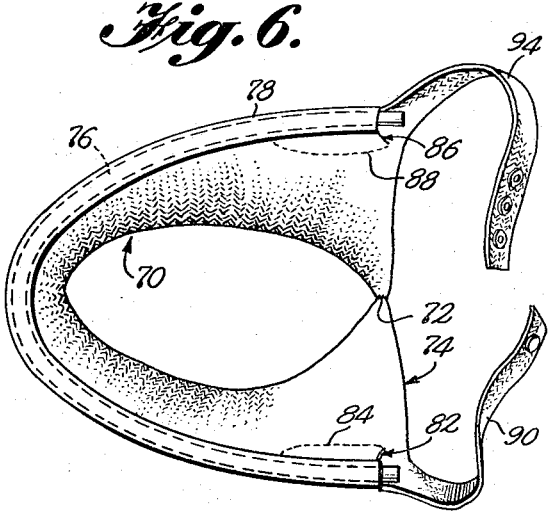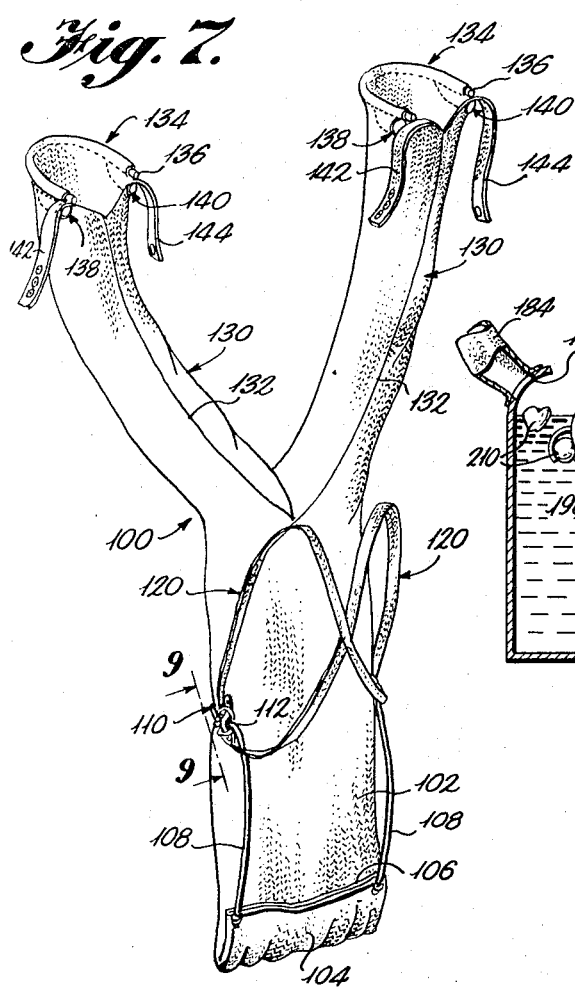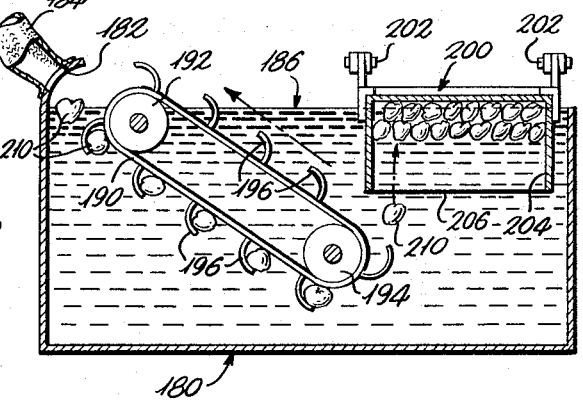

June 20, 1967   G. A. STAFFEND ET AL   3,326,345
FRUIT PICKING AND HANDLING APPARATUS
Filed Oct. 1, 1965   3 Sheets-Sheet 3
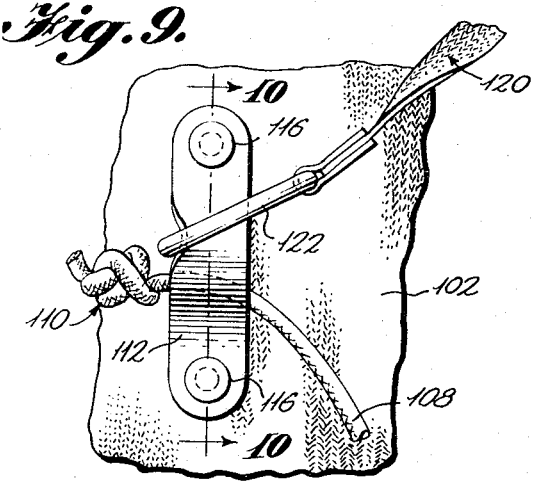
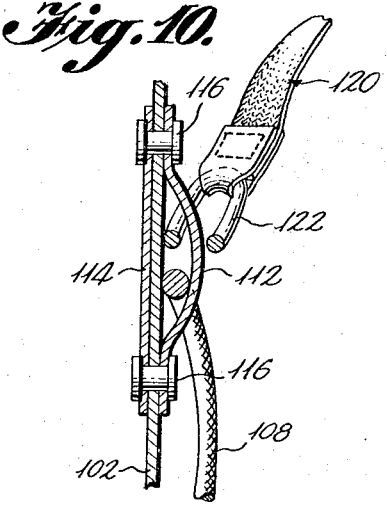
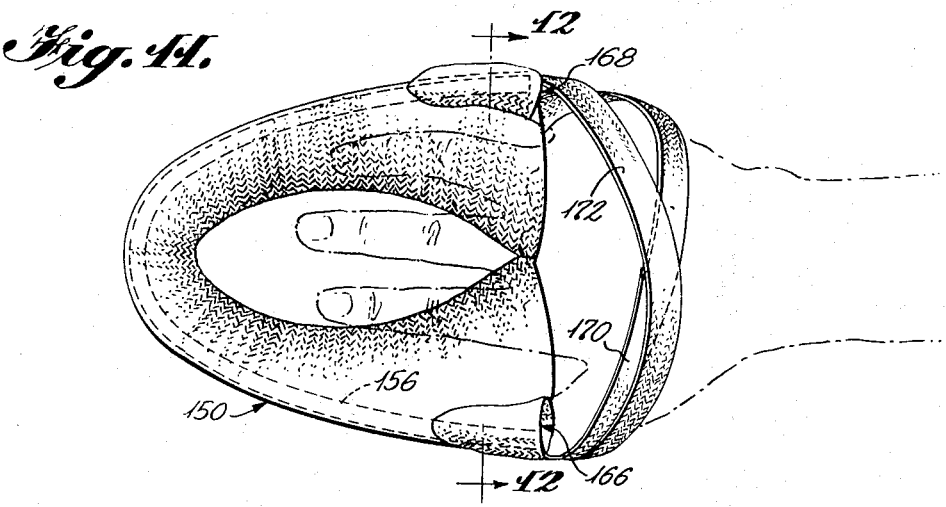
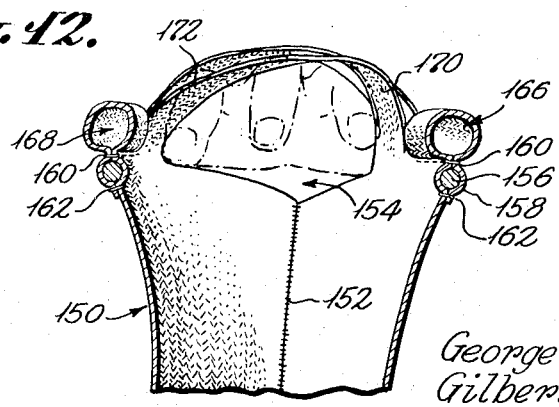
INVENTORS
George A. Staffend &
Gilbert S. Staffend
BY Shoemaker and Mattare
ATTORNEYS

United States Patent Office 3,326,345
Patented June 20, 1967

3,326,345
FRUIT PICKING AND HANDLING APPARATUS
George A. Staffend, 27999 Gates Mills Blvd., Pepper Pike, Warrensville, Ohio 44122, and Gilbert S. Staffend, 127 Chancellor St., Charlottesville, Va. 22903
Filed Oct. 1, 1965, Ser. No. 491,932
5 Claims. (Cl. 193—7)

The present invention relates to new and novel fruit picking and handling apparatus, and more particularly to such apparatus which enables the most quick and efficient handling of fruit.

The present invention is adapted to be employed with any suitable fruit or berries, and in particular is especially adapted for use in picking apples, oranges, peaches and the like wherein it is desired to do the picking by hand and further wherein the fruit is of such a nature as to be seriously damaged by bruising and the like if not handled in the proper manner.

The fruit picking apparatus of the present invention includes an elongated tubular means having an open upper end portion for receiving picked fruit or the like. This tubular means is adapted to extend downwardly for discharging the picked fruit into any suitable container. In some cases wherein the container may be carried at approximately waist level by the user of the apparatus, the tubular means may only be several feet in length. On the other hand, where the user may be supported on a ladder or the like at a relatively high elevation, the tubular means may be of considerable length so as to conduct the picked fruit and the like downwardly into any suitable receiving means.

The fruit picking apparatus of the present invention is specifically adapted for use in applications wherein the fruit is to be picked by hand, and the apparatus is such that it is quite flexible and enables free use of substantially the entire hand, and wherein the central intermediate fingers between the thumb and last finger are completely free and unencumbered.

The apparatus of the present invention is adapted to be supported by the thumb and last fingers on the hand, and accordingly the apparatus is supported only by the hand, and no attachment whatsoever is required to the wrist or arm of the user which might interfere with the movement of the wrist and arm as occasioned by the picking operation.

The arrangement of the fruit picking apparatus is further such that the open upper end portion of the tubular means which receives the picked fruit is automatically positioned immediately beneath the hand so that release of the fruit will cause fruit to drop directly into the open end portion of the tubular means under the influence of gravity. This arrangement also prevents bruising since the fruit drops immediately into the tubular means and is conducted by the flexible material of the tubular means to a suitable receiving means.

A particular advantage of the present invention is the fact that the apparatus permits the picking to occur simply by grasping the fruit in the usual manner, and then by simply opening up the fingers of the hand and releasing the fruit, the fruit automatically drops into the open end of the apparatus. No movement of the wrist or arm is necessary, and time and motion studies made on the subject indicate that this apparatus permits the most efficient type of operation to be carried out since the grasping and release of the fruit are done with a minimum of time and effort on the part of the user. Additionally, there is no necessity for moving the hand from the point where the fruit is picked to a container and then back again to another piece of fruit, but the fruit is simply released or dropped after it has been picked.

The handling apparatus of the present invention is of such a nature as to ensure that the fruit bruising will be reduced to an absolute minimum, and furthermore, it provides a most efficient and effective means for loading the fruit into boxes for shipment.

An object of the present invention is to provide new and novel fruit picking apparatus which enables free use of substantially the entire hand and wherein the intermediate fingers of the hand are completely free and unencumbered for use in the picking operation.

Another object of the invention is to provide fruit picking apparatus which is supported entirely by the hand and wherein no attachment to the wrist or arm of the user is required.

Still another object of the invention is to provide fruit picking apparatus wherein the open upper end of the apparatus is so positioned as to automatically be immediately beneath the hand of the picker to ensure that the fruit will drop directly into the open end of the apparatus, and further wherein bruising of the picked fruit and the like is reduced to a minimum.

A further object of the invention is the provision of fruit picking apparatus wherein proper release of the picked fruit is accomplished with the simplest type of physical movement so as to reduce the time and effort required to a minimum and to eliminate any movements of the hand back and forth from the point where the fruit is picked to a container and so forth.

A still further object of the invention is to provide fruit handling apparatus which reduces bruising of the fruit to a minimum and which provides an efficient means for loading boxes for shipment.

Still another object of the invention is to provide fruit picking and handling apparatus which is quite simple and inexpensive in construction, and yet which at the same time is quite efficient and reliable in use.

Other objects and many attendant advantages of the invention will become more apparent when considered in connection with the specification and accompanying drawings, wherein:

FIG. 5 is a sectional view taken substantially along line 5—5 of FIG. 4 looking in the direction of the arrows;

FIG. 6 is a top view of the apparatus shown in FIGS. 4 and 5 with the strap means thereof in a released position;

FIG. 7 is a top perspective view of still another form of the invention;

FIG. 8 is a longitudinal section through fruit handling apparatus according to the present invention;

FIG. 9 is an enlarged view taken substantially along line 9—9 of FIG. 7 looking in the direction of the arrows;

FIG. 10 is a sectional view taken substantially along line 10—10 of FIG. 9 looking in the direction of the arrows;

FIG. 11 is a top view of a modified form of the invention; and

FIG. 12 is a sectional view taken substantially along line 12—12 of FIG. 11 looking in the direction of the arrows.

Figure 1:
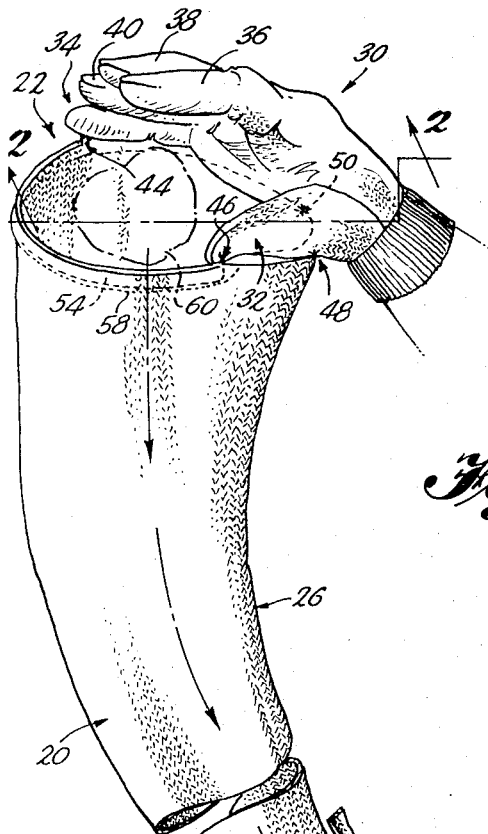
FIG. 1 is a top perspective view of a first form of the invention.
Figure 2:
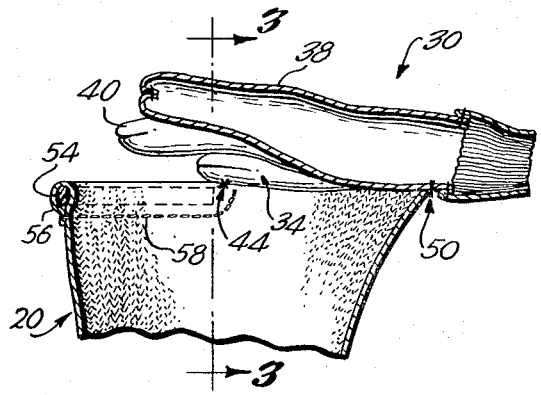
FIG. 2 is a sectional view taken substantially along line 2—2 of FIG. 1 looking in the direction of the arrows.
Figure 3:
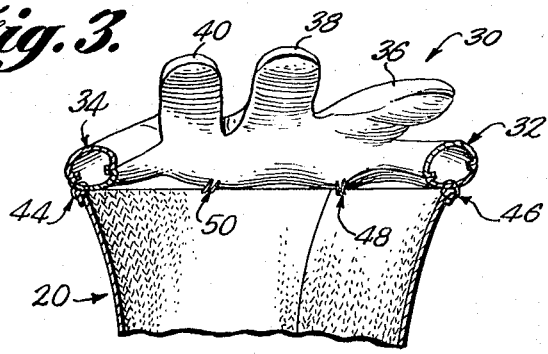
FIG. 3 is a sectional view taken substantially along line 3—3 of FIG. 2 looking in the direction of the arrows.

Referring now to the drawings wherein like reference characters designate corresponding parts throughout the several views, a first form of the invention is illustrated in FIGS. 1–3 inclusive. An elongated tubular means 20 is provided for receiving picked fruit or the like and for guiding the movement of such picked fruit into a suitable receiving means. This tubular means is formed of a suitable flexible material such as canvas or the like which is well adapted to withstand wear and abrasion occurring with normal use of this type of apparatus. The tubular means includes an open upper end portion indicated generally by reference numeral 22 for receiving picked fruit and the like, and the lower end portion 24 of the tubular means is also open for discharging fruit therefrom into the receiving means. The tubular means may be made from a single sheet of material which is sewn along a seam indicated by reference numeral 26 to provide the finished tubular means.

In this modification of the invention, a conventional glove indicated generally by reference numeral 30 is provided, this glove being formed of a suitable fabric or like substance adapted to withstand considerable wear. The glove includes the conventional thumb receiving portion 32 and the last or little finger receiving portion 34. Intermediate finger receiving portions 36, 38 and 40 are also provided in the usual manner.

The upper or open end portion of the tubular means is supported entirely by the glove which in turn is of course supported solely by the hand of a user of the apparatus. A tubular means is attached as by stitching 44 to the last finger receiving portion 34 adjacent the outer end thereof. Tubular means is also stitched as indicated by reference numeral 46 to the thumb receiving portion 32 adjacent the outer end portion thereof. The tubular means may be additionally secured to the glove by stitching as indicated by reference numerals 48 and 50 so that the tubular means is also supported adjacent the palm portion of the glove.

It will be noted that with this arrangement, the tubular means will be supported by portions which are adjacent the thumb and last finger of the hand of a user when in operative position, and the outer remaining portions of the open end portion of the tubular means will extend outwardly from and in alignment with the thumb and little finger portions of the glove. It will also be noted that the over-all arrangement is such that free use of substantially the entire hand will be permitted, and the center three fingers of the glove are completely free and unencumbered so that the middle three fingers of the user's hand can be readily manipulated for picking the fruit or the like.

The open upper end of the tubular means is also provided with reinforcing means in the form of an elongated relatively rigid yet flexible member 54 which may be in the form of a metal spring-like member, a nylon rod, or of a similar nature. This reinforcing member is secured within a folded-over portion 56 of the fabric at the upper end of the tubular means, this folded-over portion being secured in position by stitching indicated at 58. It will be noted that the reinforcing means extends outwardly from a point adjacent the ends of the thumb receiving portion and last finger receiving portion of the glove means to ensure that the open upper end of the tubular means will remain in open extended position for receiving the picked items. It is apparent that when fruit or the like have been grasped within the finger receiving portions of the glove, the fingers need only be extended so as to release the fruit such as an apple indicated by phantom line in FIG. 1 and identified by reference numeral 60 which will drop under the influence of gravity into the tubular means. It is also apparent that ample space is provided for grasping the fruit or the like and that the open upper end of the tubular means will not interfere with the picking operation.

A fruit receiving container indicated generally by reference numeral 62 is provided at the lower end of the tubular means, this container being of relatively conventional construction and including an open upper end portion 64 into which the lower end of the tubular means is adapted to discharge the picked fruit. Suitable shoulder straps 66 are provided for supporting the container in operative position whereby the container may be carried by the picker, usually at about waist level, and the apparatus of the present invention is adapted to discharge any picked fruit into such container.

Figure 4:
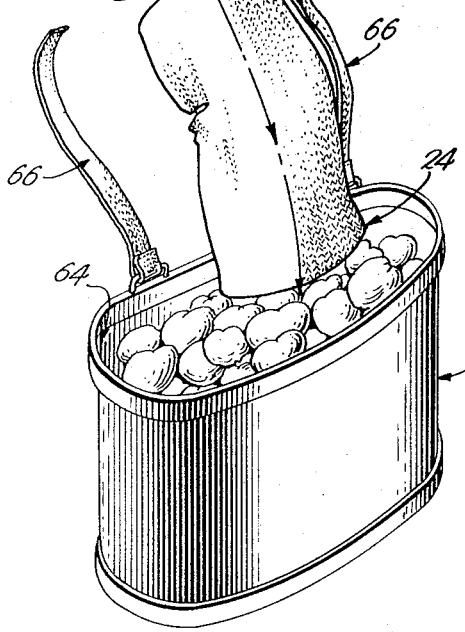
FIG. 4 is a top perspective view partly broken away for the purpose of illustration illustrating a modification of the invention.

Referring now to FIGS. 4–6 inclusive, a modified form of the invention is illustrated wherein a tubular means is indicated generally by reference numeral 70, this tubular means being formed of a material similar to that of the previously described form of the invention and being formed of a single sheet of material which is secured along the top of said edges to form a seam 72.

The tubular means includes an open upper end portion 74 having a reinforcing means 76 similar to that previously described and which is of substantially circular cross sectional configuration and is received within a pocket portion 78 formed by stitching 80 around the upper end of the tubular means.

In this form of the invention, the upper end of the tubular means is provided with a first finger receiving pocket 82 formed in the material by stitching 84, and a second finger receiving pocket 86 formed in the material by stitching 88. As seen in FIG. 4, the apparatus is illustrated in operative position upon the left hand of a user so that the thumb of the hand is positioned within pocket 86 and the last finger is received within the pocket 82. It is apparent that the apparatus may also be employed with the right hand so that the thumb and last finger would be in the opposite pockets to that illustrated in FIG. 4.

In order to firmly support the apparatus in the desired operative position, a pair of straps are provided, a first strap 90 being provided with a male portion 92 of a snap fastener, and the other strap 94 being provided with a plurality of female portions 96 of a snap fastener whereby the straps may be secured to one another at different positions therealong so as to enable the straps to be tightened about different size hands.

It is evident that in this form of the invention the apparatus is again supported entirely by the hand adjacent the thumb and last fingers of the hand of the user and the flexibility of the entire hand is not substantially affected, while the middle three fingers remain completely free and unencumbered.

Referring now to FIGS. 7, 9 and 10, a further modification of the invention is illustrated wherein the tubular means is indicated generally by reference numeral 100. The tubular means includes a lower collecting portion 102 including a foldable flap 104 at the lower end thereof and having a discharge opening 106 formed therein. This foldable flap 104 is maintained in its closed folded position as seen in FIG. 7 by a pair of holding means in the form of two pieces of rope having knots 110 formed at the upper end thereof.

As seen most clearly in FIGS. 9 and 10, the upper ends of the holding members 108 are held in place by strap means 112, one of said strap means being illustrated in FIGS. 9 and 10, it being understood that a similar strap means is provided at the opposite side of the collecting portion 102. A reinforcing strap 114 is disposed along the inner surface of the collecting portion 102 immediately inwardly of strap 112, strap portions 112 and 114 being secured to one another at opposite ends thereof by suitable fastening elements such as rivets 116 which extend through suitable holes in the associated members.

A tubular means is adapted to be supported by a user through the intermediary of shoulder straps 120, the lower ends of which are secured by means of link members 122 to the straps 112.

As seen in FIG. 7, the tubular means includes a pair of upwardly extending spaced tubular portions 130 of similar construction, each of these tubular portions including a seam 132 stitched along the length thereof. A particular advantage of the over-all arrangement as shown in FIG. 7 is that the entire tubular means may be formed of a single piece of material which may be split and sewn as shown to form the complete apparatus.

The two tubular portions 130 terminate in open upper end portions 134, it being noted that the open upper end portions 134 of tubular portions 130 are substantially identical in construction with the open upper end portion of the modification shown in FIGS. 4–6. It should be understood that the upper end portions of the tubular portions 130 can be of the construction of any of the various modifications as disclosed herein. Each of open upper end portions 134 includes an elongated reinforcing means 136 disposed within a pocket in the open upper end portion, and a pair of finger receiving pockets 138 and 140 are provided adjacent the opposite ends of the reinforcing means. A pair of straps 142 and 144 are also provided for securing the open upper end portions of the tubular portions firmly to the hand of a user.

It may be noted that the arrangement shown in FIG. 7 is especially adapted for use by a single picker wherein one hand of the picker will be disposed in operative relationship to each of the upper end portions of the two tubular portions 130.

Referring now to FIGS. 11 and 12 of the drawings, a further modified form of the invention is illustrated wherein the tubular means is indicated generally by reference numeral 150 and is formed of flexible material as in the previous modifications. This tubular means also includes a longitudinally extending seam 152 and an open upper end portion 154.

An elongated relatively rigid yet flexible reinforcing means 156 similar to that previously described is provided within a peripherally extending pocket 158 formed between the stitching 160 and 162.

A pair of finger receiving recesses 166 and 168 are provided adjacent the opposite ends of the reinforcing means, it being noted that in this modification the finger receiving recesses are disposed above the reinforcing means in contrast to the arrangements shown in FIGS. 4–7, 9 and 10 wherein the finger receiving pockets are disposed below the reinforcing means.

In the modification shown in FIGS. 11 and 12, a pair of straps 170 and 172 are provided, strap 170 being formed integral with the material of the tubular means adjacent finger receiving pocket 166 and extending across and being secured as by stitching or the like to the opposite side of the tubular means. Strap portion 172 is formed integral with the material of the tubular means adjacent the finger receiving pocket 168 and extends across and is secured as by stitching to the opposite side of the tubular means.

Referring now to FIG. 8 of the drawings, fruit handling apparatus is illustrated and comprises a container or tank 180 having a fruit receiving opening 182 formed at the upper portion thereof to which the lower end of a tubular means 184 may be connected. The tubular means 184 may be in any of the various forms of the invention previously described, whereby fruit is adapted to be discharged through opening 182 into a body of liquid such as water indicated by reference numeral 186.

A conveyor belt 190 is trained over wheels 192 and 194 which are adapted to move the conveyor belt in the direction of the arrows shown in FIG. 8. A plurality of arcuate fruit engaging portions 196 are fixed to conveyor belt 190.

A box supporting bracket 200 is pivotally mounted about pivot pins 202 secured to a suitable fixed portion, and member 200 is adapted to support a box 204 in upside-down position within the container 180 so that the open normally upper end of the box 206 is disposed in the lowermost position as seen in FIG. 8.

In operation of the apparatus shown in FIG. 8, fruit such as apples 210 will be discharged from tubular means 184 through opening 182 into the body of liquid 186 and will be supported on the surface thereof in position to be picked up by one of the fruit engaging arcuate portions 196 as the conveyor means moves in the direction indicated.

The fruit will then be moved downwardly and to the right as seen in FIG. 8 until the fruit reaches the opposite end of the conveyor whereupon as the conveyor belt moves around wheel 194, the fruit will be released so as to float upwardly due to its natural buoyancy. The fruit will float into the box 204 through the open end 206 thereof. When the box is adequately filled with fruit, a top is lowered into the water and placed in position on the box, and the member 200 is pivoted upwardly and the filled box removed therefrom, whereupon an empty box is placed in member 200 and again lowered into position for subsequent filling.

It is noted that the over-all arrangement of the handling apparatus shown in FIG. 8 is such as to reduce any possible bruising of the fruit to a minimum and further provides an unusually efficient and effective means for loading the fruit into boxes.

It is apparent from the foregoing that there is provided according to the present invention new and novel fruit picking apparatus which enables free use of substantially the entire hand of the user and wherein the center three fingers of the user are completely free and unencumbered. The picking apparatus is supported entirely by the hand of the user and no attachment to the wrist or arm is required which might interfere with movement thereof. The apparatus is automatically positioned so that it is always immediately beneath the hand of the user to ensure that the fruit will drop by gravity into the open upper end of the tubular means, and bruising of the fruit is reduced to a minimum. The release of the picked fruit is accomplished in the simplest manner by simply opening the fingers of the hand thereby substantially reducing the time and effort required in the over-all operation and further eliminating the necessity of moving the hand back and forth from the point where the fruit is picked to a container. The handling apparatus of the present invention provides an efficient means for loading the picked fruit into boxes and for preventing bruising or damage thereto. The apparatus is quite simple and inexpensive in construction, and yet at the same time is quite efficient and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Fruit picking apparatus comprising an elongated tube having an open upper end portion for receiving picked fruit and the like, a pair of spaced elongated tubular portions for receiving substantially the entire thumb and last finger of the hand of a user, said elongated tubular portions being secured to said tube adjacent the upper open end thereof at spaced portions along said tube so that the upper end of the tube will follow the movements of a person's hand when the thumb and last finger of the hand are inserted within said elongated tubular portions, the open end portion of the tube being reinforced outwardly of said elongated tubular portions with the open end portion of the tube extending a substantial distance from said tubular portions so as to be positioned beyond the outer tips of the extended fingers of a user, the intermediate fingers of a person using the apparatus being capable of free movement for picking.

2. Apparatus as defined in claim 1 including a flexible glove means, said elongated tubular portions for receiving the entire thumb and last finger of the hand of a user comprising the thumb receiving portion and the last finger receiving portion of said glove, said glove also including a plurality of intermediate finger receiving portions.

3. Apparatus as defined in claim 1 including strap means extending from said tube means adjacent said elongated tubular portions, said strap means being adapted to fit over the hand of a user for holding the apparatus in operative position.

4. Apparatus as defined in claim 3 wherein said strap means comprises a pair of straps each of which is provided with attaching means interengageable with one another for securing said straps to one another.

5. Apparatus as defined in claim 1 including a separate tube similar to said first tube and having an upper end portion of substantially identical construction, a lower collecting portion, each of said tubes being in communication with said collecting portion and extending integrally therefrom, and means for supporting the lower collecting portion of said tubes from the body of a user.

References Cited
UNITED STATES PATENTS

| | | | |
|---|---|---|---|
| 1,404,163 | 1/1922 | Pim | 150—2 |
| 1,583,041 | 5/1926 | Herrick | 150—2 |

FOREIGN PATENTS

| | | |
|---|---|---|
| 124,144 | 3/1919 | Great Britain. |

ANDRES H. NIELSEN, *Primary Examiner.*